(12) United States Patent
McKinney

(10) Patent No.: US 8,120,277 B2
(45) Date of Patent: Feb. 21, 2012

(54) HYBRID-CONTROL CURRENT DRIVER FOR DIMMING AND COLOR MIXING IN DISPLAY AND ILLUMINATION SYSTEMS

(75) Inventor: Steven J. McKinney, Piney Flats, TN (US)

(73) Assignee: Boca Flasher, Inc., Boca Raton, FL (US)

( * ) Notice: Subject to any disclaimer, the term of this patent is extended or adjusted under 35 U.S.C. 154(b) by 622 days.

(21) Appl. No.: 12/155,425

(22) Filed: Jun. 4, 2008

(65) Prior Publication Data

US 2009/0302779 A1 Dec. 10, 2009

(51) Int. Cl.
*H05B 37/02* (2006.01)

(52) U.S. Cl. .................................. 315/294; 315/307

(58) Field of Classification Search .................. 315/291, 315/294, 299, 307, 312, 313, 316
See application file for complete search history.

(56) References Cited

U.S. PATENT DOCUMENTS

| | | | |
|---|---|---|---|
| 4,870,325 A | 9/1989 | Kazar | |
| 5,008,595 A | 4/1991 | Kazar | |
| 6,016,038 A | 1/2000 | Mueller | |
| 6,150,772 A | 11/2000 | Crane | |
| 6,150,774 A | 11/2000 | Mueller | |
| 6,510,995 B2 | 1/2003 | Muthu | |
| 6,618,031 B1 | 9/2003 | Bohn | |
| 6,836,079 B2 | 12/2004 | Hong | |
| 7,038,594 B2 * | 5/2006 | Voreis et al. | 340/815.45 |
| 7,088,059 B2 | 8/2006 | McKinney et al. | |
| 7,528,818 B2 * | 5/2009 | Zheng et al. | 345/99 |
| 7,633,463 B2 * | 12/2009 | Negru | 345/46 |
| 2002/0014864 A1 | 2/2002 | Gemunder et al. | |
| 2002/0101198 A1 | 8/2002 | Kemp | |

OTHER PUBLICATIONS

Howell, W.D., "Application Note 008. Frequency Modulation Techniques for the control of LED Colour Mixing and Intensity." 2002, www.artisticlicence.com, London.
"Introduction to Power Supplies" National Semiconductor Application Note 556, Sep. 2002, National Semiconductor Corporation.
Super Nade, "Understanding Buck Regulators" www.overclockers.com, Nov. 25, 2006.

* cited by examiner

*Primary Examiner* — Thuy Vinh Tran
(74) *Attorney, Agent, or Firm* — John J. Yim

(57) ABSTRACT

A control/driver circuit produces variable current output for a lighting system providing improved dimming and color-mixing capability by allowing digital modulation control in addition to analog control over a range of illumination intensities. The circuit and method described is preferably adapted to higher current applications such as LED lighting systems using high-power LEDs. The output current of the circuit varies in proportion to the voltage level of an analog control signal, and additionally in proportion to the relative duty cycle of a digital pulsed control input.

15 Claims, 12 Drawing Sheets

Hybrid Dimming LED Driver Embodiment

Fig. 1 (Prior Art) Typical LED Intensity v. Forward Current
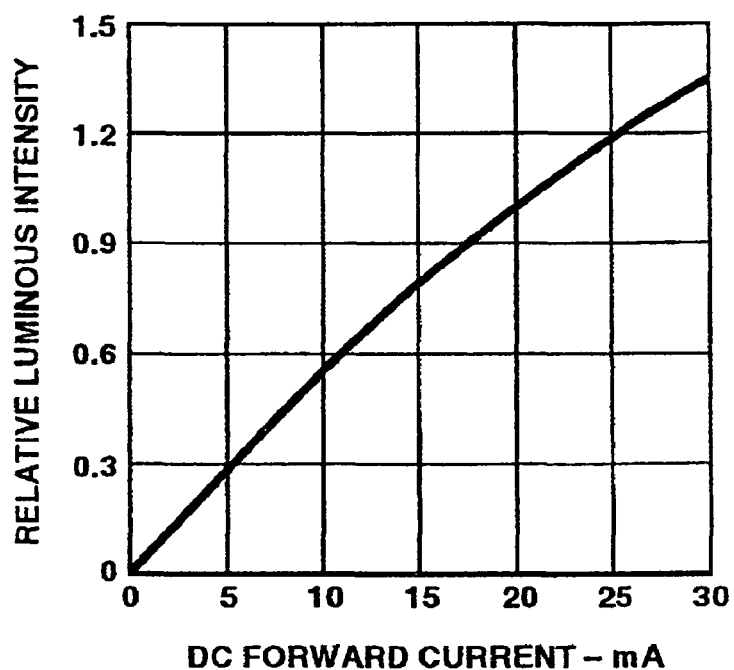

Fig. 2 (Prior Art) Analog Control LED Dimming Circuit
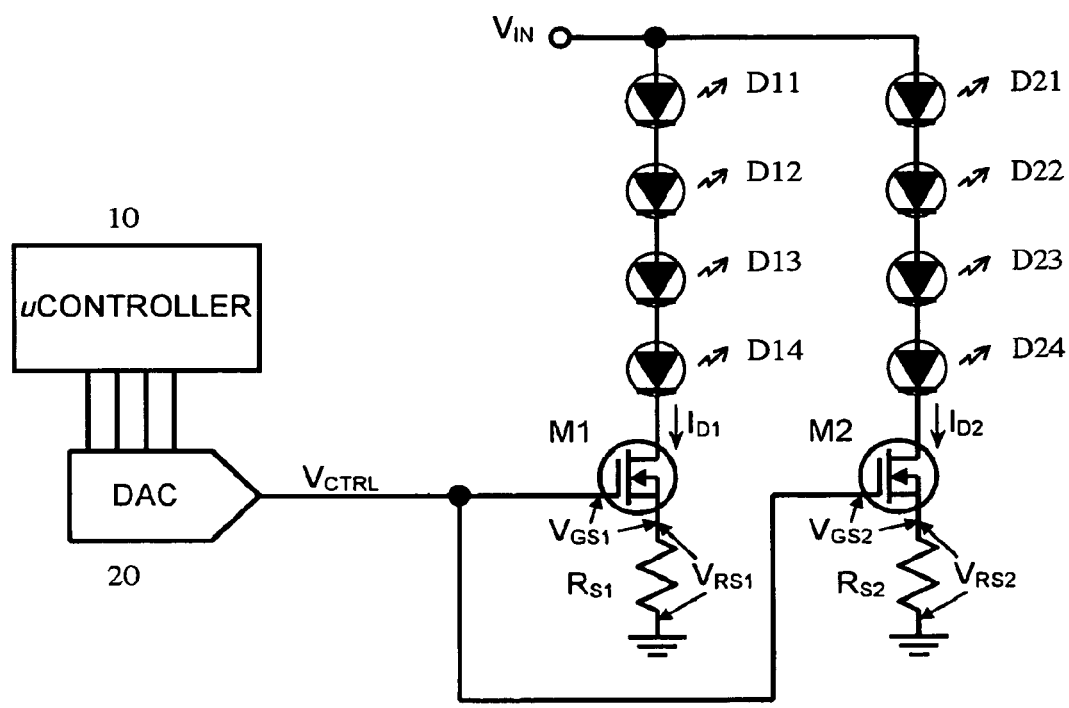

Fig. 3 (Prior Art) Typical LED Wavelength Shift v. Forward Current
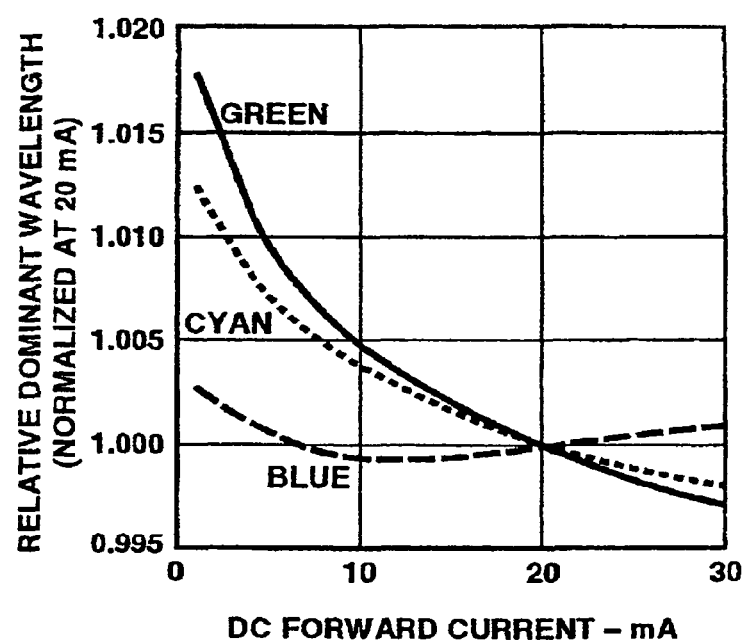

Fig. 4 (Prior Art) Modulated Analog Control LED Dimming Circuit
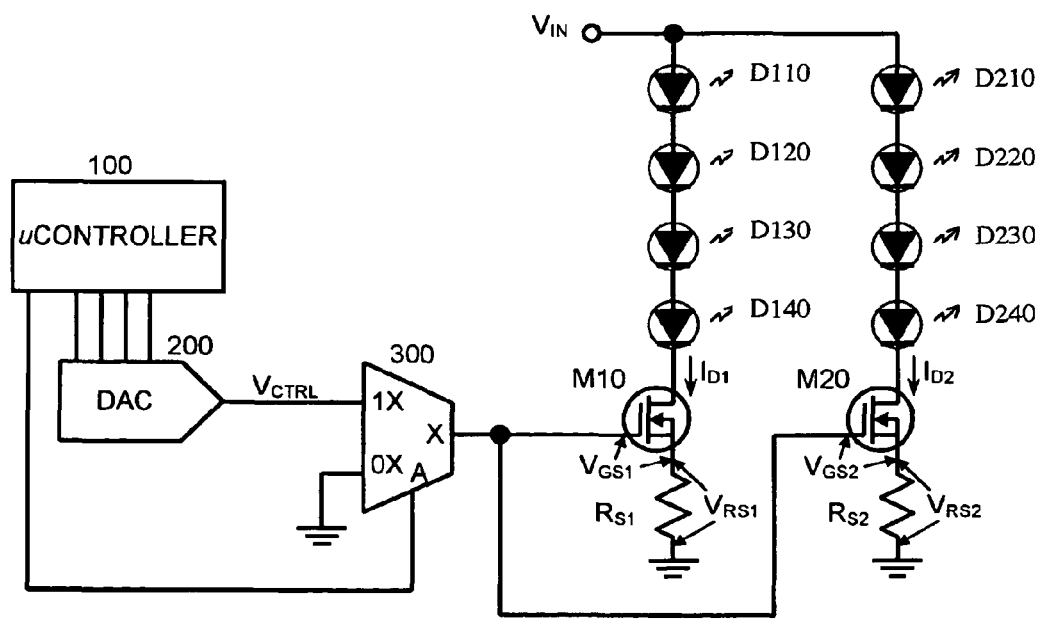

Fig. 5 (Prior Art) Characteristic Values for Modulated Analog Control LED Dimming Circuit

| LED Illumination (% of Full) | Analog Control $V_{CTRL}$ (Volts) | Instantaneous LED Current $I_D$ (mA) | Pulse Duration (us) OFF | Pulse Duration (us) ON | Effective Duty Cycle | Resultant Frequency |
|---|---|---|---|---|---|---|
| 100% | 5.00 | 20 | 0 | Continually | 100% | N/A |
| 95% | 4.85 | 19 | 0 | Continually | 100% | N/A |
| 90% | 4.70 | 18 | 0 | Continually | 100% | N/A |
| 85% | 4.55 | 17 | 0 | Continually | 100% | N/A |
| 80% | 4.40 | 16 | 0 | Continually | 100% | N/A |
| 75% | 4.25 | 15 | 0 | Continually | 100% | N/A |
| 70% | 4.10 | 14 | 0 | Continually | 100% | N/A |
| 65% | 3.95 | 13 | 0 | Continually | 100% | N/A |
| 60% | 3.80 | 12 | 0 | Continually | 100% | N/A |
| 55% | 3.65 | 11 | 0 | Continually | 100% | N/A |
| 50% | 3.50 | 10 | 0 | Continually | 100% | N/A |
| 45% | 3.35 | 9 | 0 | Continually | 100% | N/A |
| 40% | 3.20 | 8 | 0 | Continually | 100% | N/A |
| 35% | 3.05 | 7 | 0 | Continually | 100% | N/A |
| 30% | 2.90 | 6 | 0 | Continually | 100% | N/A |
| 25% | 2.75 | 5 | 0 | Continually | 100% | N/A |
| 20% | 2.75 | 5 | 100 | 400 | 80% | 2000 |
| 15% | 2.75 | 5 | 100 | 150 | 60% | 4000 |
| 10% | 2.75 | 5 | 100 | 67 | 40% | 6000 |
| 5% | 2.75 | 5 | 100 | 25 | 20% | 8000 |
| 0% | 2.75 | 5 | Continually | 0 | 0% | N/A |

Fig. 8 (Prior Art) Constant Voltage Buck Switching Regulator Circuit
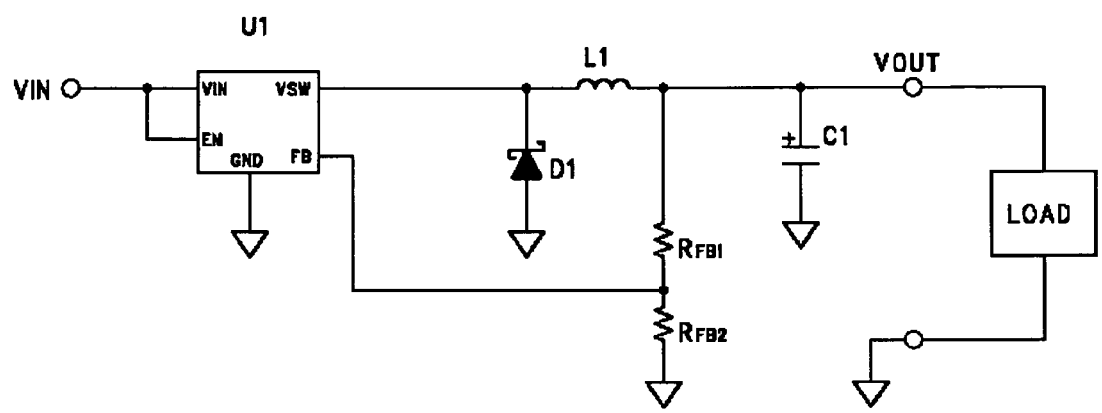

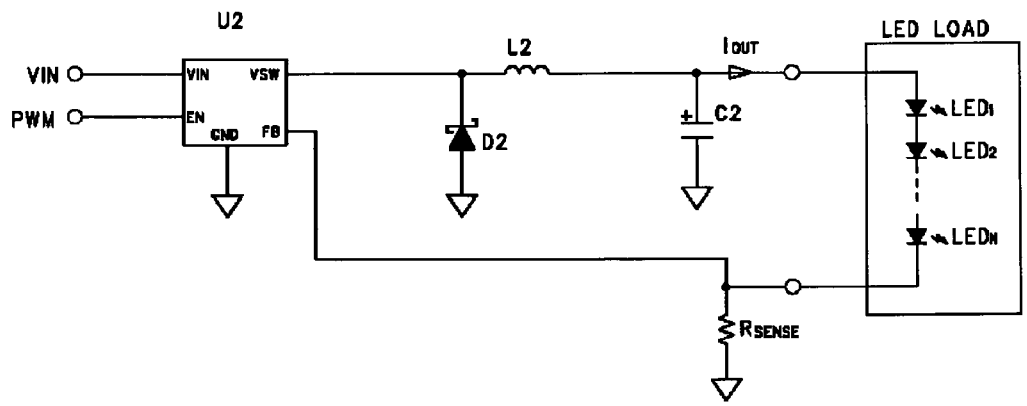
Fig. 9 (Prior Art) Constant Current Buck Switching Regulator LED Driver Circuit Fig. 10 Hybrid Dimming LED Driver Circuit
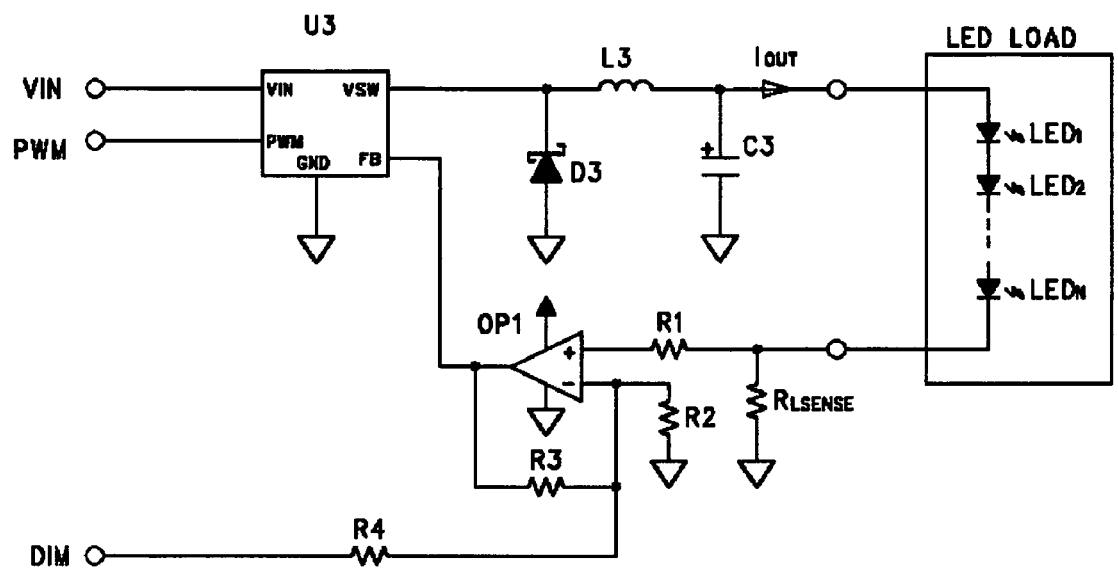

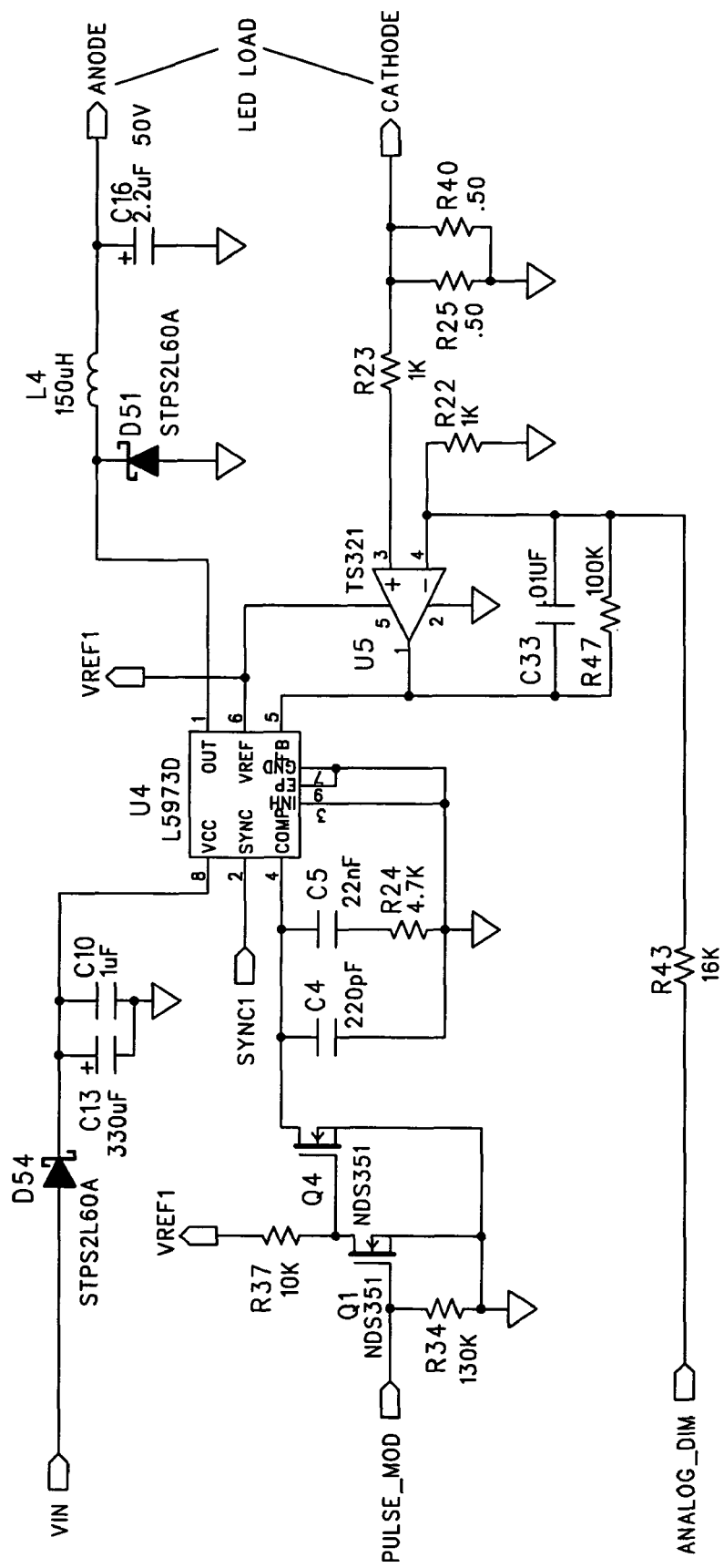
Fig. 11 Hybrid Dimming LED Driver Embodiment

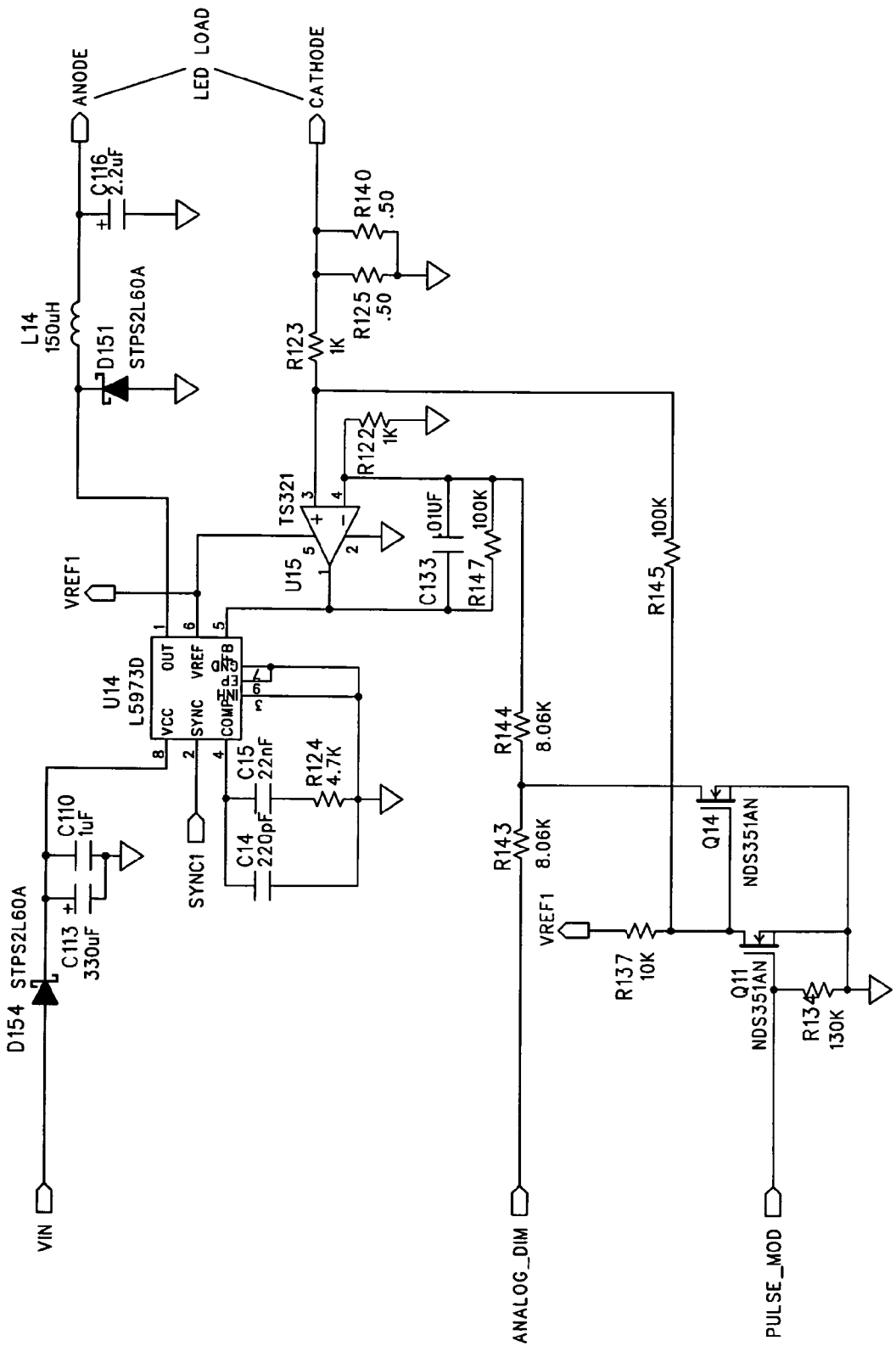
Fig. 12 Hybrid Dimming LED Driver Alternate Embodiment

HYBRID-CONTROL CURRENT DRIVER FOR DIMMING AND COLOR MIXING IN DISPLAY AND ILLUMINATION SYSTEMS

FIELD OF THE INVENTION

The present invention relates to controllers for use in illumination devices such as LEDs (light emitting diodes). The use of LEDs in illumination systems is well known. These devices are especially useful for lighting components, systems, and finished goods. LED lighting is a fast growing segment of the lighting industry due to the efficiency, reliability and longevity of LEDs. Product usage applications include but are not limited to interior and exterior signage, cove lighting, architectural lighting, display case lighting, under water lighting, marine lighting, and many others. The present invention includes lighting controllers compatible with LED bulbs, color changing LED strips, color wash controllers, LED brick lights, LED color changing disks, LED traffic/warning lights, sign modules and the like. Although the preferred embodiments of the invention are discussed in relation to LED devices, it should be understood that the present invention can be applied to other lighting technologies, such as incandescent, plasma, liquid crystal display or the like. In one embodiment of the invention, a lighting controller for LED products includes an analog control dimming circuit comprised of an OPAMP in the feedback loop of a constant-current configured Buck circuit which is further modulated with a digital pulsed ENABLE input to obtain improved dimming and color mixing capability.

BACKGROUND OF THE INVENTION

LEDs are current-controlled devices in the sense that the intensity of the light emitted from an LED is related to the amount of current driven through the LED. FIG. 1 shows a typical relationship of relative luminosity to forward current in an LED. The longevity or useful life of LEDs is specified in terms of acceptable long-term light output degradation. Light output degradation of LEDs is primarily a function of current density over the elapsed on-time period. LEDs driven at higher levels of forward current will degrade faster, and therefore have a shorter useful life, than the same LEDs driven at lower levels of forward current. It therefore is advantageous in LED lighting systems to carefully and reliably control the amount of current through the LEDs in order to achieve the desired illumination intensity while also maximizing the life of the LEDs.

LED illumination products have been developed which provide the ability to vary the forward current through the LEDs over an acceptable range in order to provide dimming capability. LED lighting systems have also been devised which, through the use of multiple colors of LEDs and individual intensity control of each color, can produce a variety of color hues. Systems incorporating Red, Green, and Blue LEDs can achieve near infinite color variations by varying the intensity of the Red, Green, and Blue color banks.

As LED Lighting Systems have become more prevalent, various methods have been devised to control the current driven through the LEDs to achieve dimming and color mixing. One common method is a Pulse Width Modulation (PWM) scheme such as that set forth in U.S. Pat. Nos. 6,618,031, 6,510,995, 6,150,774, 6,016,038, 5,008,595, and 4,870,325, all of which are incorporated herein by reference as if set forth in full. PWM schemes pulse the LEDs alternately to a full current "ON" state followed by a zero current "OFF" state. The ratio of the ON time to total cycle time, defined as the Duty Cycle, in a fixed cycle frequency determines the time-average luminous intensity. Varying the Duty Cycle from 0% to 100% correspondingly varies the intensity of the LED as perceived by the human eye from 0% to 100% as the human eye integrates the ON/OFF pulses into a time-average luminous intensity.

Although PWM schemes are common, there are several disadvantages to this method of LED intensity control. The fixed frequency nature of PWM means that all LEDs switch on (to maximum power draw) and off (zero power draw) at the same time. Large illumination systems can easily require several amperes of current to be instantaneously switched on and off. This can create two problems. First, the rapid on and off switching of the system can create asymmetric power supply loading. Second, the pulsing of the current through electrical leads can create difficult to manage electromagnetic interference (EMI) problems because such leads may act as transmitters of radiofrequency energy that may interfere with other devices operating at similar frequencies.

In order to address these problems with PWM, an alternate method of LED intensity control, called Frequency Modulation (FM) has been developed and implemented by Artistic Licence Ltd. and described at their website, particularly in Application Note 008, located at http://www.artisticlicence-.com/(last visited Jun. 17, 2004).

The FM method of LED intensity control is similar to the PWM method in that the LEDs are switched alternately from a maximum current state to a zero current state at a rate fast enough for the human eye to see one integrated time-average intensity. The two methods differ in that PWM uses a fixed frequency and a variable pulse width (duty cycle), whereas FM delivers a fixed width pulse over a variable frequency. Both of these methods achieve a dimming effect through the varying ratio of LED ON time to OFF time. Where the FM method improves upon the PWM method, is in the fact that a varying frequency creates fewer EMI problems, and reduces the asymmetric power supply loading effect.

The FM method, however, suffers from the same drawbacks of the PWM method when the dimming level is held constant, or is changing at a relatively slow rate. In fact, at a constant level of dimming, it can be seen that the EMI and asymmetric power supply loading effects of PWM and FM are identical. As the size of the lighting system (total number of LEDs) controlled by a central control and power supply gets large, these negative effects can get correspondingly large and difficult to overcome.

There is a third prior art method of LED intensity control that eliminates the drawbacks of the PWM and FM techniques, called Analog Control. Analog Control is a method of varying the current being driven through the LEDs through a continuous analog range from zero through the maximum desired level. Since the LEDs are not constantly pulsed between two states of zero and maximum current, EMI problems are minimized, as are power supply loading problems associated with large instantaneous changes in power draw. An example of a prior art LED Analog Control circuit is shown in FIG. 2.

The Analog Control method, although solving the problems associated with PWM and FM techniques for LED driving, nevertheless has other drawbacks. Due to process variations and tolerances of analog components, including the LEDs themselves, variations in luminous intensity from the desired intensity, i.e., brightness control inaccuracies, can show up at lower levels of current where component tolerances make up a larger percentage of the total effect. In addition, wavelength shifts can occur especially at lower current levels, as shown in FIG. 3, which can lead to undesired color shifts in the light output by the LEDs. As lighting designers seek to employ very low levels of output illumination, a higher degree of control in this range becomes more and more desirable.

A circuit and control method has been devised for variably controlling the current through LEDs without the drawbacks inherent in PWM and FM schemes, and that overcomes the problems with the Analog Control circuit associated with low current levels that are described above. This method is set forth in U.S. Pat. No. 7,088,059 which is incorporated herein by reference as if set forth in full. The method described in U.S. Pat. No. 7,088,059 combines the analog and pulsed dimming schemes in one circuit, allowing for a combination dimming scheme which takes advantage of the positive aspects of each scheme, while minimizing the drawbacks of the individual methods. This prior art circuit is shown in FIG. 4, along with the charts in FIGS. 5, 6, and 7 which give an example of typical control values and the resulting relative illumination levels achieved with this circuit.

The method described in U.S. Pat. No. 7,088,059 is limited, however, in its implementation of the analog circuitry. It is adapted to a linear current limiting circuit in series with the LED load as can be seen in FIG. 4. In such a linear circuit, there can be significant power loss in terms of excess circuit heat generated in the linear device. The linear devices in the U.S. Pat. No. 7,088,059 circuit are MOSFETs (M10 and M20 in FIG. 4) operated in the active transistor region. The power dissipated in M10 and M20 increases nearly linearly with increases in the LED current ($I_{D1}$ and $I_{D2}$). Because of the lower power efficiency of such linear circuits, large power systems typically do not employ them. The latest LEDs operate at currents in the hundreds of milliamps and even above 1 amp, as compared to tens of milliamps for the LEDs employed in the circuit described in U.S. Pat. No. 7,088,059. As LEDs have increased in power and luminosity output, it has become common to employ driving circuits that are active, meaning the power delivered to the end system is dynamically adapted to the requirements of the load. This results in increased system efficiency and less heat dissipated by the driving circuitry. Such active driving circuits are commonly implemented using switching regulators configured as buck, boost, or buck-boost regulators with outputs that are set to constant-voltage, or constant-current depending on the circuit. Typically, in LED driving applications, the switching regulator circuit is adapted to sense the current through the LEDs, and dynamically adjust the output so as to achieve and maintain a constant current through the LEDs.

In prior art implementations, commercial products have been developed such as Boca Flasher's SBL and HPCCS products which use switching regulators as LED drivers wherein the switching regulator circuit is pulse-enabled with a digital signal (such as PWM) in order to achieve a dimming effect (in the case of a single channel) or color mixing (in the case of multiple channel configurations).

In light of the previously discussed disadvantages of PWM and other pulsed methods of LED intensity control, there is need in the art for a simple hybrid method of analog and pulse dimming such as that disclosed in U.S. Pat. No. 7,088,059, but which is adaptable to higher power systems such as those implemented with switching-regulator driver circuits. It is an object of the present invention to provide an efficient high power LED driver circuit utilizing common switching regulators, capable of dynamically varying the current delivered to the LEDs in proportional response to an analog voltage input. It is also an object of the invention to further vary the time-average value of the LED current in proportion to a digital pulsed input. It is a further object of the present invention to combine the analog and pulsed dimming control of the LED driver circuit in such a manner as to overcome the above discussed disadvantages of both analog current dimming, and pulsed dimming methods such as PWM and FM.

BRIEF DESCRIPTION OF THE DRAWINGS

FIG. 1 is a graph showing a typical relationship of relative luminosity to forward current in an LED.

FIG. 2 is a diagram of the pertinent part of a prior art analog control LED dimming circuit.

FIG. 3 is a graph showing a typical relationship of the dominant wavelength shift to current in blue, cyan and green LEDs.

FIG. 4 is a diagram of the pertinent part of the prior-art modulated analog control LED dimming circuit disclosed in U.S. Pat. No. 7,088,059.

FIG. 5 is a table of values characterizing one example of the embodiment shown in FIG. 4.

FIG. 8 is a diagram of a typical buck switching regulator circuit configured to deliver a constant voltage to a load.

FIG. 9 is a diagram of a buck switching regulator circuit configured to supply constant current to high-power LEDs.

FIG. 10 is a generalized circuit diagram of the present invention.

FIG. 11 is a detailed circuit diagram of one embodiment of the present invention.

FIG. 12 is a detailed circuit diagram of an alternate embodiment of the present invention.

SUMMARY OF THE INVENTION

Figure 6:
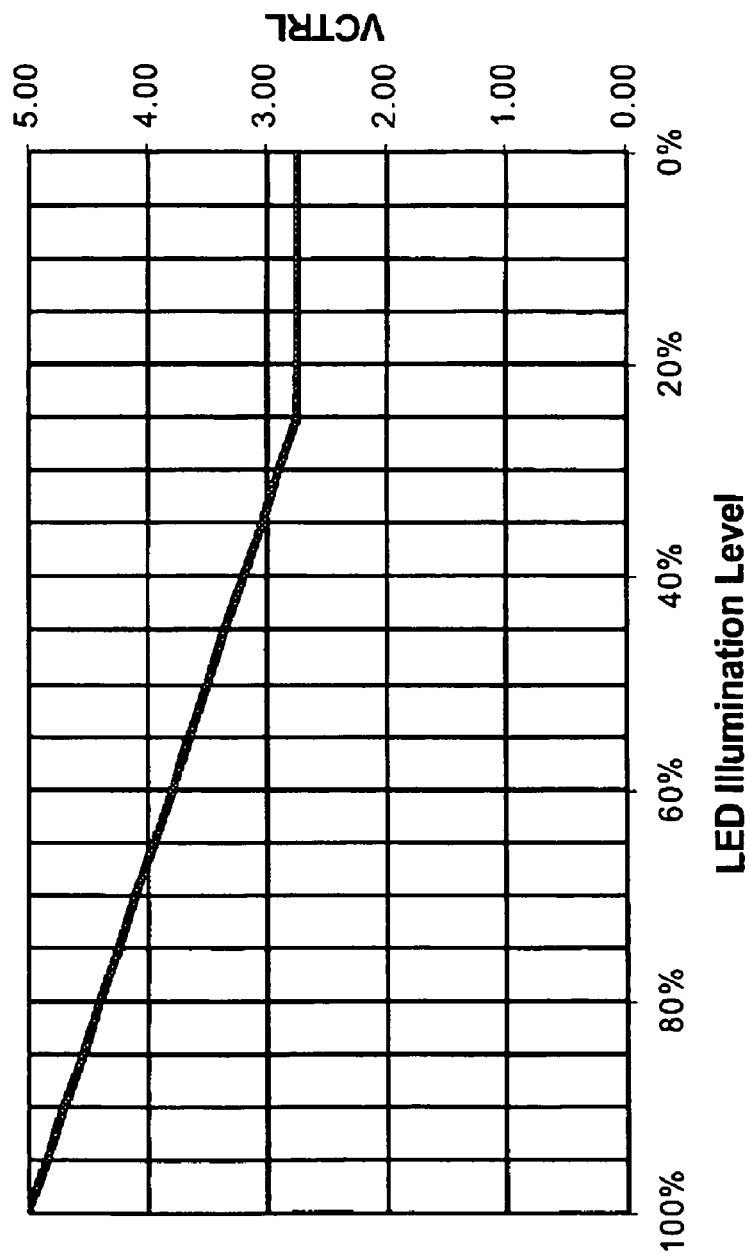
FIG. 6 is a graph showing the relationship of the values for VCTRL output and LED illumination from FIG. 5.
Figure 7:
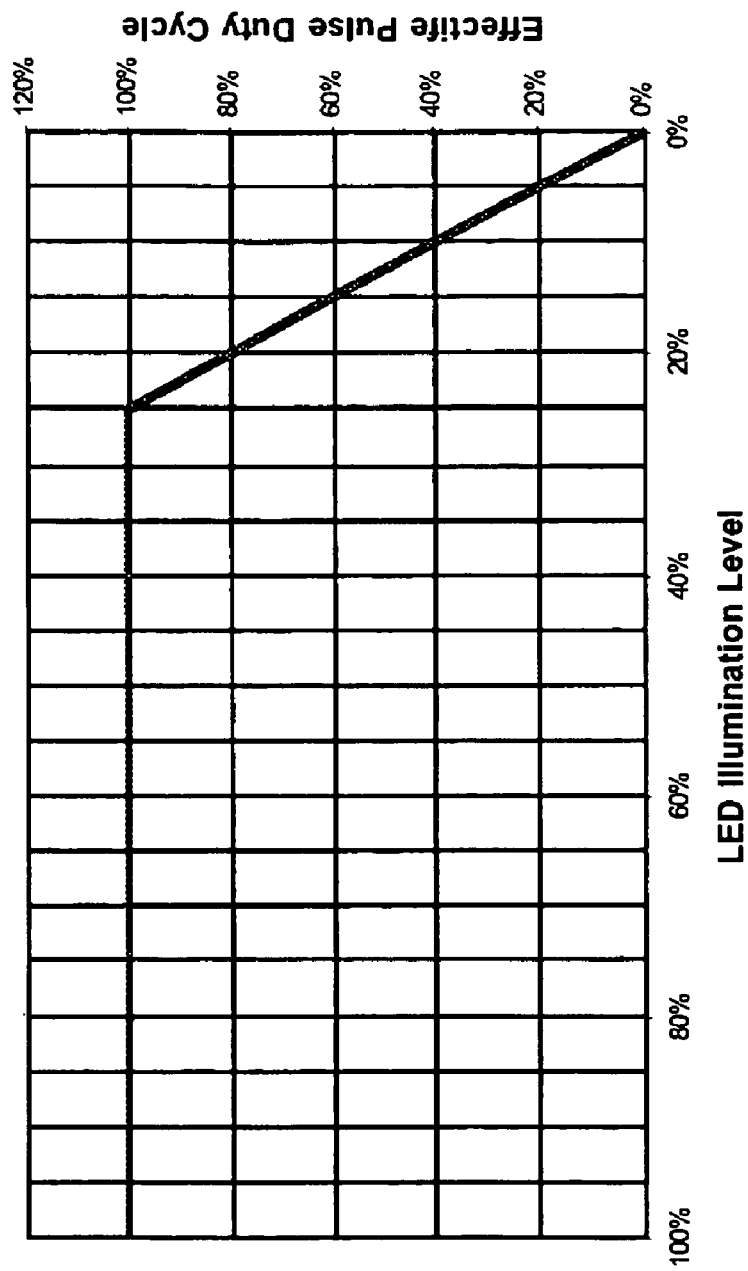
FIG. 7 is a graph showing the relationship of the values for the Effective Pulse Duty Cycle and LED illumination from FIG. 5.

The present invention concerns a lighting controller for LED products, particularly those that employ dimming and color changing effects. An advantage of the present invention is that it enhances control of an analog current limiting circuit when it is operated at low current levels. The present invention provides greater control over illumination intensity and hue for LED lighting systems by reducing differences in illumination intensity among LEDs in separate control strings and also minimizing color shifts at low levels of output illumination. The present invention also reduces the difficulties relating to EMI and asymmetric power supply loading effects found in PWM and FM control methods. Additionally, the present invention is adapted to high-power LED systems incorporating switching regulator driving circuits, providing these benefits in arbitrarily large power LED systems. Further advantages of the invention will become apparent to those of ordinary skill in the art through the disclosure herein. The advantages of the present invention can be obtained by using a modulated control LED dimming circuit with only a minimal addition of components or control signals.

One aspect of the invention relates to a method for controlling the intensity of an illumination source, such as an LED, by providing an input signal to a circuit containing the illumination source, and varying the input signal over a first range of illumination intensities so that the intensity of the illumination source varies in proportion to the voltage of the input signal; and varying the input signal over a second range of illumination intensities of said illumination source such that the intensity of said illumination source varies in proportion to the voltage of the input signal and additionally in proportion to the relative duty cycle of a second input signal which is pulsed between two discrete voltage levels representing logic "1" and logic "0".

Another aspect of the invention relates to an illumination control circuit comprising: a controlling module having one or more analog output signals producing output control voltages each individually variable within a range of values, said controlling module additionally having one or more digital output signals and producing digital pulses between logic "1" and logic "0" each with relative duty cycles individually variable within a range of values; one or more intensity modules receiving said analog output signals and said digital output signals of said controlling module to control one or more illumination sources; wherein said intensity modules are controlled according to said analog output signals and said digital output signals of said controlling module to vary the intensity of said illumination sources in proportion to the voltage level of said analog output signals, and additionally in proportion to the relative duty cycles of said pulses of said digital output signals.

The advantages of the present invention can be obtained using a microcontroller having an input/output port and one or more output signals; said output signals of said microcontroller each having a first state and a second state; one or more digital-to-analog converters each having as an input the input/output port from said microcontroller, and each having one or more output signals; one or more power regulating devices each having as a first input the output signal from one of said digital-to-analog converters and each having as a second input one of said output signals from said microcontroller, and each having a power output signal; wherein each of said power output signals from each of said power regulating devices delivers power according to the output signal from one of said digital-to-analog converters when the corresponding output signal of said microcontroller is in its first state, and each of said power output signals delivers no power when the corresponding output signal of said microcontroller is in its second state.

Another aspect of the invention relates to an illumination control circuit comprising, for example: a microcontroller adapted to write an output control signal to a digital-to-analog converter according to programmed instructions; said digital-to-analog converter having an analog output signal that varies according to said output control signal of said microcontroller; a power regulating device receiving said analog output signal of said digital-to-analog converter to control an illumination source; wherein said power regulating device is controlled according to said analog output signal of said digital-to-analog converter to vary the intensity of said illumination source over a first range of illumination intensities of said illumination source such that the intensity of the illumination source varies in proportion to the voltage of said analog output signal of said digital-to-analog converter, and a second range of illumination intensities of said illumination source such that the intensity of said illumination source varies in proportion to the voltage of said analog output signal of said digital-to-analog converter and further in proportion to the relative duty cycle of a second pulsed output control signal from said microcontroller.

DETAILED DESCRIPTION OF THE INVENTION

For the purpose of this discussion, the term "analog current control" will be defined as the use of a control signal input which is continuously variable over a range of voltages to cause a corresponding output signal to deliver a current to a load wherein said output current is continuously variable within a range of output currents. "Digital" or "pulsed current control" will refer to the use of a control signal input which is capable of two logic levels. "1" or "0". corresponding to two discrete voltage levels to affect the time-average output current which is delivered to a load by causing said output current to be delivered at one discrete level when said input is at the "1" logic level, and to be delivered at a second level (typically, but not necessarily 0) when said input is at the "0" logic level. As discussed in the BACKGROUND section, pulsed current control is typically PWM, but can also be FM or any other modulation technique designed to achieve an output level that, when time-averaged, achieves an intermediate level between two extremes of a range of levels. Also in this discussion, the term "dimming" should be understood to mean changing the luminous output level of one or more LEDs by varying the amount of current through the LED(s). In addition, "dimming" should be understood to include color-mixing when LEDs of two or more output wavelengths are dimmed separately to different intensities such that the resulting combined output of said LEDs results in a new color created from the combined effect.

Referencing prior art U.S. Pat. No. 7,088,059, it has been demonstrated that both of the problems inherent in analog current control methods for dimming and color mixing in LED illumination (color shifting and brightness inaccuracies/inconsistencies) are more pronounced at lower current levels. Alternately, as discussed in U.S. Pat. No. 7,088,059, the problems inherent with pulsed current control in LED illumination systems are more pronounced at higher current levels. The modulated control circuit and method taught in U.S. Pat. No. 7,088,059 takes advantage of the positive aspects of both control methods while minimizing the drawbacks of each method. However the implementation is limited in its practicality due to inherent power inefficiencies of linear circuits. The limitation of the U.S. Pat. No. 7,088,059 can be prohibitive in large high-power systems incorporating many high-current LEDs.

The present invention is best understood by starting with a typical implementation of a prior-art switching regulator LED driver circuit. FIG. 8 shows a diagram of a typical buck switching regulator circuit configured to output a constant voltage to a load. A detailed description of the operation of a buck switching regulator is known and can be found in such reference documents as the National Semiconductor application note AN-556, and the article "Understanding Buck Regulators", both cited above. Referring to FIG. 8, the switching regulator U1 using an internal pass transistor (not shown) will connect the input voltage VIN to the inductor L1 through U1 output VSW. This causes current to flow through the inductor L1, and the capacitor C1 begins to build up a charge. As the C1 voltage builds up, a current will flow through the feedback resistors RFB1 and RFB2 causing a sense voltage to appear at the U1 feedback input FB according to the equation FB=VOUT×RFB2/(RFB1+RFB2). An internal comparator circuit (not shown) within U1 senses when FB reaches a predetermined level, and then disconnects the input VIN from VSW. As the LOAD draws current from the circuit, the capacitor begins to discharge, and the sense voltage FB begins to drop. The switching regulator senses the drop on FB, and then reconnects the input VIN to the inductor L1. based on the values of L1, CI and the sense resistors RFB1 and RFB2, U1 will continue connecting and disconnecting the input voltage VIN to the inductor L1 in order to keep the output at a level which provides the proper feedback voltage FB. This connecting and disconnecting operation in a PWM fashion causes the output voltage VOUT to regulate at a constant level which can be shown from the previous equation to be VOUT=FB×(RFB1+RFB2)/RFB2. Because of the circuit topology, it is obvious that the output voltage VOUT is always less than the input voltage. This is generally the nature of a Buck Switching Regulator circuit. The circuit detailed in FIG. 8 is called a constant voltage output, because it regulates the output voltage VOUT that is presented to the load.

LEDs are current-controlled devices in that the illumination given off by the LED is proportional to the current through the LED, as shown in FIG. 1. Also, since LEDs are diodes, it is obvious to anyone skilled in the art, that their voltage-current relationship follows a typical diode curve in that a very small voltage difference across the LED results in a very large current difference through it. Because of these relationships, it is advantageous to directly regulate the current through LEDs rather than regulating the voltage across them.

The circuit shown in FIG. 9 is a slight modification from the buck switching regulator circuit shown in FIG. 8. Referring to FIG. 9, the feedback resistors of FIG. 8 have been replaced with a single current sense resistor $R_{SENSE}$ which is in series with the load. In this configuration, the current passing through the load LED LOAD, essentially all passes through RSENSE since the feedback input FB of U2 is a very high impedance input. The switching regulator will operate as described for the constant-voltage circuit of FIG. 8, except that as the regulator U2 regulates the output to achieve the proper voltage at FB, it actually regulates the current through the load LED LOAD according to the equation FB=$I_{OUT}$× $R_{SENSE}$. Therefore, the output current $I_{OUT}$=FB/$R_{SENSE}$. In this way, a Buck switching regulator circuit is commonly configured to regulate the current through loads such as LEDs that are current dependant. One additional modification shown in the circuit of FIG. 9 is the enable input EN of the regulator U2. In the circuit of FIG. 8, the Enable input was shown connected to VIN so that the regulator U1 is always operating to regulate the output when there is sufficient voltage on the input VIN. In the circuit of FIG. 9, the Enable input EN of U2 is configured to accept a PWM input from a controller circuit (not shown) such that the output will be regulated to the constant-current level set by $R_{SENSE}$ when the PWM input is at a voltage level above that required to enable the switcher U2, and the output current will be reduced to zero when the PWM input is at a voltage below this threshold. Thus, the time-average output current through the LED LOAD can be adjusted to a range of levels between zero and the maximum set by $R_{SENSE}$ through the use of standard PWM or other digital pulsed dimming schemes. Such prior-art circuitry has been implemented in Boca Flasher's HPCCS and SBL products. However, as discussed in the Background section, there are disadvantages to this strictly digital pulsed dimming scheme.

The present invention is one that improves over these prior-art techniques through the use of combined analog and pulse dimming methods in a typical switching regulator driving circuit. One embodiment of the invention can now be understood through an examination of the circuit shown in FIG. 10. It should be understood that although the present invention can be implemented as will be discussed in FIGS. 10 through 12, the scope of the invention is not limited to these implementations. The invention can be implemented using other common switcher circuits such as Boost and Buck-Boost, or any other active power circuit incorporating a feedback mechanism to sense and adjust the power being delivered to the output. The embodiments described herein are exemplary and not limiting.

Referring to FIG. 10, the circuit can be seen to be a modification of the constant-current configured buck switching regulator circuit of FIG. 9. The feedback connection from $R_{SENSE}$ to U2 in the standard circuit of FIG. 9 has been replaced by the opamp circuit (OP1, R1, R2, R3, and R4) in the present invention embodiment of FIG. 10. The feedback voltage created as the LED LOAD current $I_{OUT}$ passes through $R_{LSENSE}$ is presented to the positive input (+) of OP1. OP1 is an operational amplifier configured in a standard non-inverting amplifier configuration. In this configuration, OP1 will amplify the voltage difference between its + and − inputs, and present this amplified voltage to the feedback FB input of U3. As discussed above, the switching regulator U3 will increase or decrease the output current $I_{OUT}$, until the voltage at its FB input reaches the proper level. This level is a preset value particular to the specific switching regulator used.

The addition of the opamp circuit in the feedback loop in FIG. 10 provides two advantages over the standard circuit of FIG. 9. First, since the opamp is configured as a non-inverting amplifier, it amplifies the voltage presented to its + input, so a small voltage across $R_{LSENSE}$ will result in a larger voltage presented to FB of U3. This allows a lower value resistor to be used for $R_{LSENSE}$ which means that lower power and heat will be dissipated in $R_{LSENSE}$ for a given desired output current $I_{OUT}$. Ignoring the presence of R4 and the DIM input for a moment, the voltage gain of the opamp circuit is defined as $A_V$=$V_{OUT}$/$V_{IN}$=(1+R3/R2). Thus, choosing values for R2 and R3 to achieve $A_V$=10 for example would allow an $R_{LSENSE}$ value of 1/10 that required for $R_{SENSE}$ in FIG. 9, to achieve the same $I_{OUT}$ through the LED LOAD. This results in 1/10 the power and heat dissipated through RLSENSE and also means a smaller physical circuit size and more efficient driving circuit.

The second advantage provided by the inclusion of the opamp circuit in the feedback loop is that it allows the analog voltage signal DIM to directly control the LED current $I_{OUT}$ delivered by the switching regulator U3. In FIG. 10, the analog control signal DIM is connected to the negative (−) input of OP1 through R4. When the analog signal DIM=0V (GND), it can be seen that resistor R4 is in parallel with resistor R2, which results in a lower combined resistance. Substituting this lower resistance for R2 in the gain equation above, shows that the voltage gain of the opamp circuit is increased when DIM=0V. The switching regulator U3 will then lower the output current $I_{OUT}$ which lowers the sense voltage presented to OP1 at the positive input in order to compensate for the increased FB level. As the analog voltage of DIM is increased, it presents an increasing positive voltage component to the negative input (−) of OP1. The opamp OP1 will then reduce its output to correspondingly reduce the feedback voltage component to its negative (−) input to keep the negative (−) and positive (+) inputs balanced. Therefore, the greater the voltage input component presented to (−) by DIM, the lower the voltage presented by the OP1 output for the same voltage on its positive (+) input. Because the OP1 output is connected to the FB input of the switching regulator U3, as the OP1 begins to drop its output voltage, U3 will sense the reducing FB and increase the $I_{OUT}$ current to compensate. The increased $I_{OUT}$ will result in an increase voltage across $R_{LSENSE}$ which is presented to the OP1 positive (+) input. Therefore, as the switching regulator U3 and the opamp OP1 both work to keep their corresponding feedback voltages in balance, the result will be that the analog voltage input DIM will effect a change in output current $I_{OUT}$ delivered to the LEDs. The LED LOAD current will be reduced as DIM decreases toward 0V and it will be increased as DIM increases. For a given range of DIM voltages, the values of R1, R2, R3, R4, and $R_{LSENSE}$ can be chosen to affect a desired range of output currents $I_{OUT}$.

FIG. 11 shows a detailed schematic of one embodiment of the invention. In this embodiment, the switching regulator U4 has an Inhibit INH input which is essentially an opposite polarity Enable input such as EN in FIG. 9. The circuit of FIG. 11 has the switcher U4 always enabled by connecting the INH input to Ground so that it is never inhibited (turned off) by this input. Instead, a digital pulsed input is applied to the COMP input of U4 through the use of the two MOSFETs Q1 and Q4 which receive the PWM input from an external digital controller (not shown). The COMP input functions as an enable input on the L5973D (U4) switcher. It is used here instead of the INH input because of the faster response of U4 to the COMP input as opposed to the INH input. Thus the circuit of FIG. 11 can respond to higher frequency PWM or other digital pulsed inputs. When the PULSE_MOD input is pulsed to logic "0" below the turn-on threshold (approximately 1.5V) of Q1, the MOSFET Q1 will present a high impedance between its source and drain pins, and the resistor R37 will pull up the gate of Q4 to the reference voltage VREF1 potential. This reference voltage (3.3V for U4) will turn MOSFET Q4 "on" causing it to present a low impedance between its source and drain which will connect the COMP pin to ground. This will cause the switcher U4 to turn off, and its output OUT to go to zero. When the input PULSE_MOD is at a logic "1" level above the turn-on threshold of Q1, the gate of Q4 will be connected to ground, causing Q4 to present a high impedance between its source and drain, allowing the COMP input of U4 to float to its normal level and causing the switcher U4 to function normally, regulating the output OUT. MOSFETs Q1 and Q4 form a non-inverting buffer between PULSE_MOD and COMP, and allow for negative (below ground) excursions of PULSE_MOD without damaging U4. This allows a digital dimming control circuit such as from a microcontroller output to be remotely located from the power regulating circuit of FIG. 11.

Now, referring to the output section of the FIG. 11 circuit, R25 and R40 function as the sense resistor of the standard constant-current regulator discussed in FIG. 9. Here two resistors in parallel allow for higher power dissipation as higher output currents pass through the sense resistors, and allow for easier resistor value combinations to tune the circuit to various maximum currents.

The analog control input ANALOG_DIM will present a voltage to the negative "−" input of the Opamp U5 causing the output current delivered to the LED LOAD to increase when ANALOG_DIM increases and to decrease when ANALOG_DIM decreases as discussed in the explanation of the FIG. 10 circuit above. The values for the resistors R22, R23, R25, R40, R43 and R47 have been chosen so that the LED LOAD current will be 1.2 A when ANALOG_DIM is at its maximum voltage level of 5.0V. When ANALOG_DIM is at its minimum of 0V, R43 and R22 will be in parallel with an effective resistance of $R_{EFF}=1/(1/R43+1/R22)=941$ ohms. Using the opamp gain equation presented above, it can be seen that when ANALOG_DIM=0V. $A_V=1+R47/R_{EFF}=107.25$. The switching regulator U4 will regulate the output current so that its FB pin sees 1.23V. This will occur when the input at the opamp U5 positive (+) pin=1.23V/107.25=11.66 mV. The LED LOAD current will be 11.66 mV/(R25 in parallel with R40)=11.66 mV/0.25 ohms=45.9 mA. Therefore, as ANALOG_DIM varies from 0V to 5V, the LED LOAD current will be caused to vary from 46 mA to 1.2 A.

By combining the effect of the analog control through ANALOG_DIM and the digital pulse control through PULSE_MOD, very sophisticated dimming algorithms can be achieved. The circuit implemented in FIG. 11 therefore provides for a simple hybrid method of analog and pulse dimming such as that disclosed in U.S. Pat. No. 7,088,059, but which is adapted to higher power systems such as those implemented with switching-regulator driver circuits. As such, the present invention is a practical implementation for a hybrid dimming circuit adaptable to arbitrarily large LED systems.

The methods disclosed in the present invention can be implemented in any power regulating circuit which provides a feedback path to measure and adjust the output. Other topologies such as Boost regulator circuits (where the system input voltage is lower than the required output voltage), and Buck-Boost or SEPIC topologies can also be adapted to this Hybrid Dimming control method. In some cases, the switching regulator used in the circuit may not have an Enable or PWM input which can be used to rapidly pulse the regulator on and off for digital control. In this case, a simple modification to the opamp circuit in the feedback loop can allow for both digital and analog control without the use of a separate input on the switching regulator. FIG. 12 demonstrates this modification in an alternate embodiment of the invention.

Referencing FIG. 12, the resistor coupling the analog input ANALOG_DIM has been split into two resistors (R143 and R144) in series. The non-inverting buffer composed of MOSFETs Q11 and Q14, and resistors R134 and R137 is connected to the junction of R143 and R144. Now, when the digital control input PULSE_MOD is at 0V, Q11 will be "off", and R137 will pull up the gate of Q14 turning it "on", which pulls the input to R144 to ground. This essentially removes the ANALOG_DIM input from the opamp circuit, and places R144 in parallel with R122. The opamp gain is then $A_V=1+100K/(1K\|8.06K)=113.4$. Without the inclusion of R145, the LED LOAD current would be set at I=(1.23V/113.4)/0.25 ohms=43 mA. However, it is desired to be zero when the digital pulse input PULSE_MOD is zero. This is affected through the addition of R145 which provides an additional voltage component that is summed into the U15 (+) input. As PULSE_MOD is at 0V, Q11 is "off" providing a high impedance between its source and drain, so R145 and R137 are essentially in series forming a 110K ohm resistor connecting VREF1 to U15 (+). It can be shown that the voltage at U15 (+) is calculated from the following formula: U15 (+)=(VREF1*R123/(R123+R145+R137))+($V_{SENSE}$*(R145+R137)/(R123+R145+R137))=(VREF1*0.009)+$V_{SENSE}$*0.991. The L5973D switcher U14 provides VREF1=3.3V, and its FB voltage is set at 1.23V. $V_{SENSE}$ is defined as $R125\|R140*I_{LED\ LOAD}$. Substituting these values along with the opamp gain calculated above yields:

$$FB = A_V * U15(+)$$

$$1.23V = 113.4*(0.0297+0.248 I_{LED\ LOAD}) = 3.368 + 28.12 I_{LED\ LOAD}$$

Therefore $I_{LED\ LOAD}=-76$ mA

Since the switcher U14 cannot produce a negative current through the LED LOAD, it will remain shut down to try and regulate the output as the FB input remains higher than 1.23V. Therefore, the result of adding in the VREF1 component through R145 will cause the switcher to shut the output current to 0 A when the digital input PULSE_MOD is at logic "0" (0V).

When the PULSE_MOD input is at logic "1" (5V), MOSFET Q11 will turn "on", pulling R145 to ground and turning MOSFET Q14 "off". With Q14 "off", its source and drain will have a high impedance between them, which decouples R144 from ground and allows the ANALOG_DIM input to be presented to the opamp negative input U15 (−) through a combined resistance of R143+R144=16.1K. The effect of R145 connecting ground to the + input of opamp U15 is to slightly lower the voltage presented to U15 (+) from $V_{SENSE}$ ($I_{LED\,LOAD}$*R125‖R140):

$$U15(+)=VSENSE*R145/(R145+R123)=VSENSE*0.99$$

So the switcher U14 will increase the LED LOAD current by 1/0.99=1.01 over its original value (when using the same resistor values without the addition of R145). The resistors in the opamp circuit can be recalculated to get the exact maximum output current desired in this alternate circuit with R145.

It has been shown then, that the alternate circuit in FIG. 12 accomplishes the same Hybrid dimming technique demonstrated in FIG. 11 (providing for both analog and pulsed dimming) in active driver circuits using switcher regulator components that do not have built in provision for pulse enabling.

In the embodiments shown in FIGS. 11 and 12, the levels chosen for the analog dimming range are from 5.0V, to 0.5V corresponding to a dimming range of 100% to 10% performed with analog dimming. During this range of values, the PWM or pulsed dimming input PULSE_MOD is held to constant logic "1" so that all dimming in the higher current range is analog, and there are no EMI issues, or power supply loading issues that can be associated with large output switching currents in pulsed dimming methods. For dimming below 10%, the analog dimming input ANALOG_DIM is held at the 0.5V level, and the pulsed dimming input PULSE_MOD is pulsed digitally with an effective duty cycle of from 100% to 0% corresponding to a dimming range of 10% (100% duty cycle with analog dim set to 10% level) down to 0% or off (0% duty cycle with analog dim set to 10% level). It should easily be recognized that other values or ranges can be chosen without detracting from the scope of the invention. Further, the dimming ranges can be overlapped such that at some ranges, both analog and digital dimming signals are changed concurrently to achieve a combination dimming affect. The present invention provides much more detailed control over the output of a switching regulator circuit used to drive an LED load than has been previously available with prior art circuits. Not only does this provide full flexibility to overcome the disadvantages of each type of dimming as discussed previously, but it adds a finer level of control in which to achieve very specific and smooth output dimming curves.

What is claimed is:

1. An illumination control circuit comprising:
   a controlling module comprising:
      one or more analog output signals producing output control voltages each individually variable within a range of values, and one or more digital output signals and producing digital pulses between logic "1" and logic "0" each with relative duty cycles individually variable within a range of values;
   one or more intensity modules receiving
      said one or more analog output signals and said one or more digital output signals of said controlling module to control one or more illumination sources;
   wherein said one or more intensity modules are controlled according to said one or more analog output signals and said one or more digital output signals of said controlling module to vary the intensity of said illumination sources in proportion to a voltage level of said analog output signals, and additionally in proportion to the relative duty cycles of said digital pulses of said one or more digital output signals,
   and wherein
      said intensity modules each comprise
         a switching regulator circuit
            containing a switching device
               wherein said switching device includes an input pin
                  capable of disabling its output
               and receiving in its feedback loop one of said one or more analog output signals from said controlling module;
         a pair of transistors configured to form an open-drain, non-inverting buffer;
         wherein said non-inverting buffer
            receives as its input one of said one or more digital output signals from said controlling module, and produces a buffered digital output signal;
         and wherein said buffered digital output signal from said non-inverting buffer is received by said switching device in said switching regulator circuit through said input pin.

2. The illumination control circuit of claim 1 wherein said controlling module further comprises:
   a microcontroller comprising
      an input/output port, and
      one or more output signals, said one or more output signals of said microcontroller each having a first state and a second state; and
   one or more digital-to-analog converters each comprising
      as an input, the input/output port from said microcontroller, and
      an analog output signal.

3. The illumination control circuit of claim 2 wherein said intensity modules each provides
   a regulated current or voltage output;
      wherein said regulated current or voltage output from said intensity module is controlled according to the analog output signal from one of said one or more digital-to-analog converters when said second input signal from said microcontroller is in its first state,
      and wherein said regulated current or voltage output from said intensity module is zero when said second input signal from said microcontroller is in its second state.

4. The illumination control circuit of claim 3 wherein said regulated current or voltage outputs of said intensity modules jointly vary the intensity of said illumination sources in order to achieve a dimming effect.

5. The illumination control circuit of claim 3 wherein said regulated current or voltage outputs of said intensity modules individually vary the intensities of multiple colored illumination sources to vary the hue of the combined output of light.

6. The illumination control circuit of claim 3, wherein the illumination sources comprise light emitting diodes.

7. The illumination control circuit of claim 2, wherein the output signals of said microcontroller are frequency modulated.

8. The illumination control circuit of claim 2, wherein the output signals of said microcontroller are pulse width modulated.

9. The illumination control circuit of claim 1, wherein the illumination sources comprise light emitting diodes.

10. An illumination control circuit comprising:
    a microcontroller adapted to write a digital pulsed modulation signal to a power regulating device, and additionally adapted to write an output control signal to a digital-to-analog converter according to programmed instructions;

said digital-to-analog converter having an analog output signal that varies according to said output control signal of said microcontroller;
a power regulating device
receiving said analog output signal of said digital-to-analog converter to control an illumination source,
and receiving said digital pulsed modulation signal of said microcontroller,
and regulating the power delivered to an illumination source to control the intensity of said illumination source;
wherein said power regulating device comprises
a switching regulator circuit
containing a switching device
wherein said switching device includes an input pin capable of disabling its output
and receiving in its feedback loop said analog output signal from said digital-to-analog converter;
a pair of transistors configured to form an open-drain, non-inverting buffer;
wherein said non-inverting buffer
receives as its input said digital pulsed modulation signal of said microcontroller, and
produces a buffered digital output signal;
and wherein said buffered digital output signal from said non-inverting buffer is received by said switching device in said switching regulator circuit through said input pin; and
wherein said power regulating device is controlled according to the analog output signal of said digital-to-analog converter to vary the intensity of said illumination source over
a first range of illumination intensities of said illumination source such that the intensity of the illumination source varies in proportion to the voltage of said analog output signal of said digital-to-analog converter,
and a second range of illumination intensities of said illumination source such that the intensity of said illumination source varies
in proportion to the voltage of the analog output signal of said digital-to-analog converter
and additionally in proportion to a relative duty cycle of said pulsed modulation signal of said microcontroller.

11. An illumination control circuit comprising:
a controlling module comprising
one or more digital output signals each having a first state and a second state,
one or more analog output signals producing output control voltages each individually variable within a range of values;
one or more intensity modules receiving said one or more digital output signals and said one or more analog output signals of said controlling module to control one or more illumination sources;
wherein said one or more intensity modules are controlled according to said one or more analog output signals of said controlling module to vary the intensity of said one or more illumination sources in proportion to the voltage level of said one or more analog output signals,
and additionally in response to a pulsing of said one or more digital output signals between said first state and said second state;
and wherein each intensity module comprises
a power regulator having in its feedback loop one of said analog output signals from said controlling module,
and each having an output connected to one or more of said illumination sources which
provides a current to said one or more illumination sources proportional to a voltage level of said one or more analog output signals when said one or more digital output signals is in its first state
and provides no current to said one or more illumination sources when said one or more digital output signals is in its second state.

12. The illumination control circuit of claim 11 wherein said feedback loop of said power regulator comprises:
a sense resistor in series with said one or more illumination sources, said sense resistor providing a voltage signal proportional to a current through said one or more illumination sources;
a comparator having as its first input, said voltage signal from said sense resistor, and having as its second input said one or more analog output signals from said controlling module;
said comparator having an output connected to the feedback input of said power regulator;
said output of said comparator being provided in proportional response to a voltage from said sense resistor compared to said one or more analog output signals from said controlling module.

13. The illumination control circuit of claim 11 wherein each power regulator is a constant-current configured buck switching regulator.

14. The illumination control circuit of claim 11 wherein each power regulator is a constant-current configured boost switching regulator.

15. The illumination control circuit of claim 11 wherein each power regulator is a constant-current configured buck-boost switching regulator.

* * * * *